(12) United States Patent
Inaba

(10) Patent No.: US 8,557,211 B2
(45) Date of Patent: Oct. 15, 2013

(54) REACTION APPARATUS FOR PRODUCING TRICHLOROSILANE AND METHOD FOR PRODUCING TRICHLOROSILANE

(75) Inventor: Chikara Inaba, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/531,628

(22) Filed: Jun. 25, 2012

(65) Prior Publication Data

US 2012/0275982 A1 Nov. 1, 2012

Related U.S. Application Data

(62) Division of application No. 12/289,209, filed on Oct. 22, 2008, now Pat. No. 8,226,895.

(30) Foreign Application Priority Data

Oct. 25, 2007 (JP) ................................. 2007-277787

(51) Int. Cl.
*C01B 33/107* (2006.01)

(52) U.S. Cl.
USPC ........................................ 423/342; 423/341

(58) Field of Classification Search
USPC ................................. 423/341, 342
See application file for complete search history.

(56) References Cited

U.S. PATENT DOCUMENTS

| 6,666,436 | B1 | 12/2003 | Lerner |
| 2007/0178028 | A1 | 8/2007 | Fukasawa et al. |
| 2009/0104104 | A1* | 4/2009 | Inaba ............................ 423/342 |

FOREIGN PATENT DOCUMENTS

| JP | 02-145413 | 6/1990 |
| JP | 2519094 | 6/1990 |

OTHER PUBLICATIONS

A. G. Casatkin, "Basic processes and apparatuses of the chemical Technology," Moscow, Goschimizdat, 1961, p. 490, 491, and 497 and English translation thereof.
Office Action dated Apr. 12, 2012, issued for Russian patent application No. 2008141970 and English translation thereof.
European Search Report dated May 13, 2009, issued on the corresponding European Application No. 08167140.6.

* cited by examiner

*Primary Examiner* — Ngoc-Yen Nguyen
(74) *Attorney, Agent, or Firm* — Edwards Wildman Palmer LLP

(57) ABSTRACT

A reaction apparatus for producing trichlorosilane in which metal silicon powder M is reacted with hydrogen chloride gas, thus generating trichlorosilane, includes: an apparatus body into which the metal silicon powder is supplied; and an ejection port for ejecting the hydrogen chloride gas into the apparatus body from the bottom part of the apparatus body, wherein a plurality of holed pieces having a through hole penetrating in the thickness direction and a plurality of pellets interposed between these holed pieces are stacked in a mixed state on the upper side of the ejection port.

2 Claims, 3 Drawing Sheets

REACTION APPARATUS FOR PRODUCING TRICHLOROSILANE AND METHOD FOR PRODUCING TRICHLOROSILANE

This application is a divisional application of U.S. application Ser. No. 12/289,209 filed Oct. 22, 2008 which claims the right of priority under 35 U.S.C. §119 based on Japanese Patent Application No. 2007-277787 filed Oct. 25, 2007.

CROSS-REFERENCE TO RELATED APPLICATIONS

Priority is claimed on Japanese Patent Application No. 2007-277787, filed Oct. 25, 2007, the content of which is incorporated herein by reference.

BACKGROUND OF THE INVENTION

1. Field of the Invention

The present invention relates to a reaction apparatus for producing trichlorosilane and a method for producing trichlorosilane used in reacting metal silicon powder with hydrogen chloride gas, thereby generating trichlorosilane.

2. Description of Related Art

Trichlorosilane ($SiHCl_3$) used as a raw material for producing extremely high purity silicon having a purity greater than 99.999999999% is produced, for example, by reacting metal silicon powder (Si) of about 98% in purity with hydrogen chloride gas (HCl).

As described above, as a reaction apparatus for generating trichlorosilane through reactions of metal silicon powder with hydrogen chloride gas, there is proposed an apparatus which is provided with an apparatus body into which metal silicon powder is supplied and an ejection port for ejecting hydrogen chloride gas into the apparatus body from the bottom part of the apparatus body. Metal silicon powder, the grain size of which is relatively small, for example, 1000 μm or less, is supplied into the apparatus body, hydrogen chloride gas is ejected from the bottom part of the apparatus body to fluidize the metal silicon powder, thereby the metal silicon powder is brought into contact with the hydrogen chloride gas sufficiently to produce trichlorosilane through the reactions thereof.

In this case, in order to facilitate the reaction of metal silicon powder with hydrogen chloride gas, it is effective to disperse the hydrogen chloride gas uniformly into the apparatus body without any maldistribution of flow.

Conventionally, in order to disperse hydrogen chloride gas, a porous nozzle having a plurality of ejection ports is used as an ejection member. However, when the porous nozzle or the like is used, there is a case where the ejection ports may be clogged with metal silicon powder. For this reason, such a problem exists in that there is a failure in uniform contact of metal silicon powder with hydrogen chloride gas, non-uniform reactions proceed inside the reaction apparatus, thereby generating silicon tetrachloride in an increased quantity to result in a decreased efficiency of generating trichlorosilane. There is also a problem in that reactions proceed locally to result in a rise in temperature at a part concerned and the reaction apparatus itself may be broken. There is another problem in that due to maldistribution of hydrogen chloride gas flow, grains of metal silicon powder collides to cause wear on the inner surface of the apparatus body, thermometers, internal parts or the like.

Therefore, as a method for preventing the above-described clogging and also dispersing hydrogen chloride gas, Japanese Patent No. 2519094 disclosed an apparatus in which a flat-plate shaped holed piece layer is disposed on the upper side of a nozzle and a granule layer is also disposed on the flat-plate shaped holed piece layer. As described above, the flat-plate shaped holed piece layer is disposed, thereby suppressing the metal silicon powder from entering into the ejection ports of the nozzle, preventing the ejection ports from being clogged, thus making it possible to prevent non-uniform ejection of hydrogen chloride gas due to wear and subsequent enlargement of the ejection ports resulting from the metal silicon powder. Further, hydrogen chloride gas is ejected toward the metal silicon powder through the flat-plate shaped holed piece layer, by which the hydrogen chloride gas can be uniformly and widely dispersed and therefore uniformly fluidized without any maldistribution of flow.

Incidentally, in the reaction apparatus for producing trichlorosilane described in Japanese Patent No. 2519094, the lower layer in which flat-plate shaped holed pieces are stacked and the upper layer in which ball members are stacked on the flat-plate shaped holed piece layer are installed so as to be separated. Thus, there is a case where in the flat-plate shaped holed piece layer, the flat-plate shaped holed pieces are stacked on each other in a state in which they are individually laid down and the flat-plate shaped holed pieces are arranged so as to be firmly attached to each other. When a plurality of these holed pieces are firmly attached to each other, no clearance is secured between the flat-plate shaped holed pieces, thus resulting in a fear that the effect of dispersion of hydrogen chloride gas may not be sufficiently obtained.

Further, since there has been a great increase in demand for high-purity silicon, there is now a need for more efficient production of trichlorosilane than before.

SUMMARY OF THE INVENTION

The present invention has been made in view of the above circumstances, an object of which is to provide a reaction apparatus for producing trichlorosilane and a method for producing trichlorosilane capable of reliably dispersing hydrogen chloride gas to produce trichlorosilane more efficiently, thereby reducing the generation of silicon tetrachloride to the least possible extent.

The reaction apparatus for producing trichlorosilane according to the present invention is a reaction apparatus for producing trichlorosilane in which metal silicon powder is reacted with hydrogen chloride gas to generate trichlorosilane, the reaction apparatus for producing trichlorosilane including: an apparatus body into which the metal silicon powder is supplied; and an ejection port which is opened on the upper face of a partition plate partitioning the bottom part of the apparatus body and ejects the hydrogen chloride gas into the apparatus body, wherein a plurality of plate-shaped holed pieces having through holes penetrating in the thickness direction and a plurality of pellets interposed between these holed pieces are stacked in a mixed state on the upper side of the ejection port.

In the above-constituted reaction apparatus for producing trichlorosilane, on the upper side of the ejection port placed at the bottom part of the apparatus body, the holed pieces having through holes penetrating in the thickness direction and the pellets interposed between these holed pieces are stacked in a mixed state. Therefore, the pellets are interposed between the holed pieces to secure a clearance between the holed pieces, thus making it possible to prevent the holed pieces from being firmly attached to each other and to eject hydrogen chloride gas through the clearance between the holed pieces. Further, the pellets are interposed therebetween, by which the holed pieces are not stacked in a state in which they are laid down but arranged so as to face in every direction. As a result, the hydrogen chloride gas can be widely dispersed.

Thereby, hydrogen chloride gas is more widely dispersed than ever before, and metal silicon powder is uniformly in contact with the hydrogen chloride gas inside the reaction apparatus, thus making it possible to suppress the generation of silicon tetrachloride and to produce trichlorosilane more efficiently. Further, even when the hydrogen chloride gas flow is temporarily decreased or halted, no maldistribution of flow takes place and the reaction apparatus can be started again easily and operated for a longer time.

Further, in the reaction apparatus for producing trichlorosilane according to the present invention, the pellets are preferably mixed with the holed pieces in a weight ratio of 0.5 to 5.

These pellets and holed pieces are able to disperse hydrogen chloride gas widely in a state in which they are retained to such an extent to move slightly at a lower part of the apparatus body, while suppressing a phenomenon that they are blown upward to the upper side of the apparatus body due to the ejection pressure of hydrogen chloride gas. In this case, if a weight mixture ratio of the pellets to the holed pieces is lower than 0.5, it is difficult to suppress the phenomenon that the holed pieces are blown upward by the hydrogen chloride gas, and on the contrary, when the weight mixture ratio is in excess of 5, the pellets settle down, thus making it difficult to maintain a mixed state with the holed pieces.

Further, in the reaction apparatus for producing trichlorosilane according to the present invention, it is preferable that the pellets are ball members with a diameter of 5 mm to 20 mm, the holed pieces are formed in a circular flat-plate shape, the holed pieces are set to be from 4 mm to 20 mm in an outer diameter, and the through hole is of such a dimension that no pellet is inserted therethrough.

In the above-constituted reaction apparatus for producing trichlorosilane, since the pellets are ball members, the holed piece is in contact with the outer surface (spherical surface) of the ball member in a smaller area and can be moved easily by ejecting hydrogen chloride gas. Therefore, the holed pieces are moved by the hydrogen chloride gas ejected from the ejection port; thereby, the hydrogen chloride gas can be more widely dispersed.

Still further, since the ball members are set to be 5 mm or more in diameter, it is possible to prevent the ball members from being blown upward by ejection of hydrogen chloride gas. Also, since the ball members are set to be 20 mm or less in diameter, the ball members can be arranged so as to be interposed between the holed pieces.

On the other hand, since the holed pieces are formed in a circular flat-plate shape and set to be 4 mm or more in outer diameter, the holed pieces are prevented from being blown upward by ejection of hydrogen chloride gas. Also, since the holed pieces are set to be 20 mm or less in outer diameter, the pellets can be mixed with the holed pieces and stacked on the upper side of the ejection port. Further, a through hole of the holed pieces is such a dimension that the pellet is not inserted therethrough. Therefore, no pellets enter into the through hole, the pellets can be reliably interposed between the holed pieces, thereby preventing the holed pieces from being firmly attached to each other.

The method for producing trichlorosilane of the present invention is a method for producing trichlorosilane in which metal silicon powder is reacted with hydrogen chloride gas, thereby generating trichlorosilane, comprising stacking a plurality of plate-shaped holed pieces having through holes penetrating in the thickness direction and a plurality of pellets interposed between these holed pieces in a mixed state on the upper side of a partition plate partitioning the bottom part of an apparatus body into which the metal silicon powder is supplied and ejecting the hydrogen chloride gas from an ejection port, which is opened on the upper face of the partition plate, while supplying the metal silicon powder into the apparatus body.

According to the present invention, it is possible to provide a reaction apparatus for producing trichlorosilane capable of reliably dispersing hydrogen chloride gas to produce trichlorosilane more efficiently; thereby reducing the generation of silicon tetrachloride to the least possible amount.

DETAILED DESCRIPTION OF THE INVENTION

Hereinafter, a description will be given of a reaction apparatus for producing trichlorosilane which is an embodiment of the present invention by referring to the attached drawings.

Figure 1:
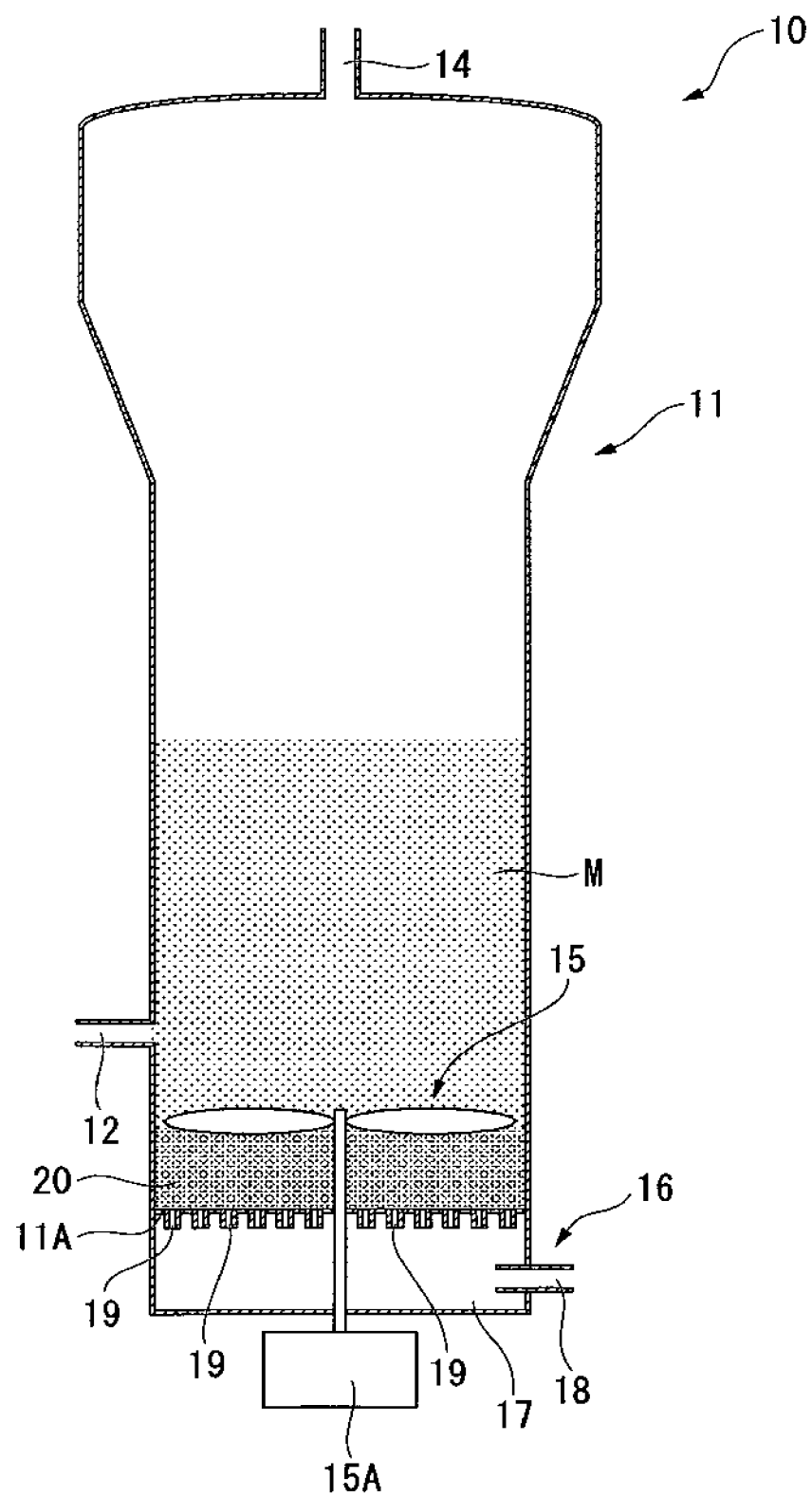
FIG. 1 is a cross-sectional view for explaining the reaction apparatus for producing trichlorosilane, which is an embodiment of the present invention.

The reaction apparatus 10 for producing trichlorosilane shown in FIG. 1, which is the present embodiment, is provided with an apparatus body 11 formed approximately in a cylindrical shape having a bottom and a ceiling part.

A silicon powder supplying port 12 for supplying metal silicon powder M into the apparatus body 11 is formed at the lower part of the side wall of the apparatus body 11. Further, a gas outlet 14 for taking out trichlorosilane gas generated by reactions is disposed at the ceiling part of the apparatus body 11.

An agitation device 15 which is rotated by a motor 15A is provided at the lower part inside the apparatus body 11.

A horizontal partition plate 11A is disposed at the bottom part of the apparatus body 11, and a gas introduction device 16 for introducing hydrogen chloride gas into the apparatus body 11 on the upper side of the partition plate 11A is disposed below the partition plate 11A.

The gas introduction device 16 is provided with a gas chamber 17 at which hydrogen chloride gas is retained below the partition plate 11A, a gas supplying port 18 for supplying hydrogen chloride gas into the gas chamber 17, and a plurality of ejection members 19 which penetrate through the partition plate 11A to eject hydrogen chloride gas from the gas chamber 17 into the apparatus body 11. In addition, an ejection port 19A of the ejection member 19 is opened on the upper face of the partition plate 11A (refer to FIG. 4) and set to be about 3 mm in diameter.

Figure 2:
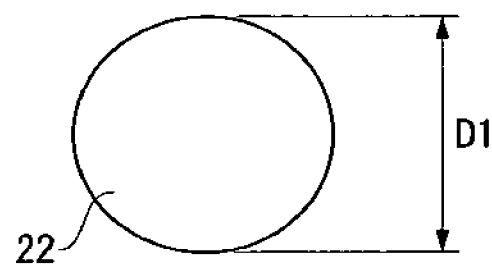
FIG. 2 is a elevational view for explaining a ball member used in the reaction apparatus for producing trichlorosilane shown in FIG. 1.
Figure 3:
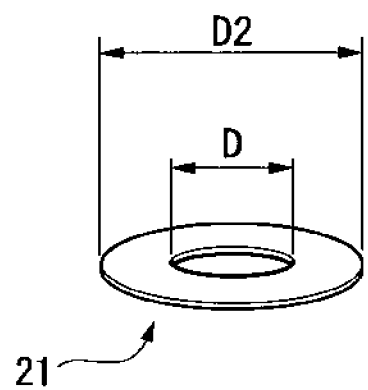
FIG. 3 is a perspective view for explaining a holed piece used in the reaction apparatus for producing trichlorosilane shown in FIG. 1.

Then, on the upper side of the ejection port 19A of the ejection member 19, that is, on the upper face of the partition plate 11A, a mixture layer 20 is disposed in which a ball member 22 shown in FIG. 2 and a flat-plate shaped holed piece 21 shown in FIG. 3 are mixed. The mixture layer 20 is disposed so as to be positioned between the agitation device 15 and the partition plate 11A, and the metal silicon powder M is supplied on the upper side of the mixture layer 20.

The ball member 22 is made of stainless steel, for example, and set to be from 5 mm to 20 mm in diameter D1.

Further, the holed piece 21 is, as shown in FIG. 3, formed in a circular flat-plate shape, having a circular hole in its cross section, more specifically, a washer made of stainless steel. The holed piece 21 is set to be from 0.2 mm to 3.0 mm in thickness and from 4 mm to 20 mm in an outer diameter D2. Still further, the inner diameter d of the holed piece 21 is set to be smaller than the outer diameter D1 of the ball member 22.

Figure 4:
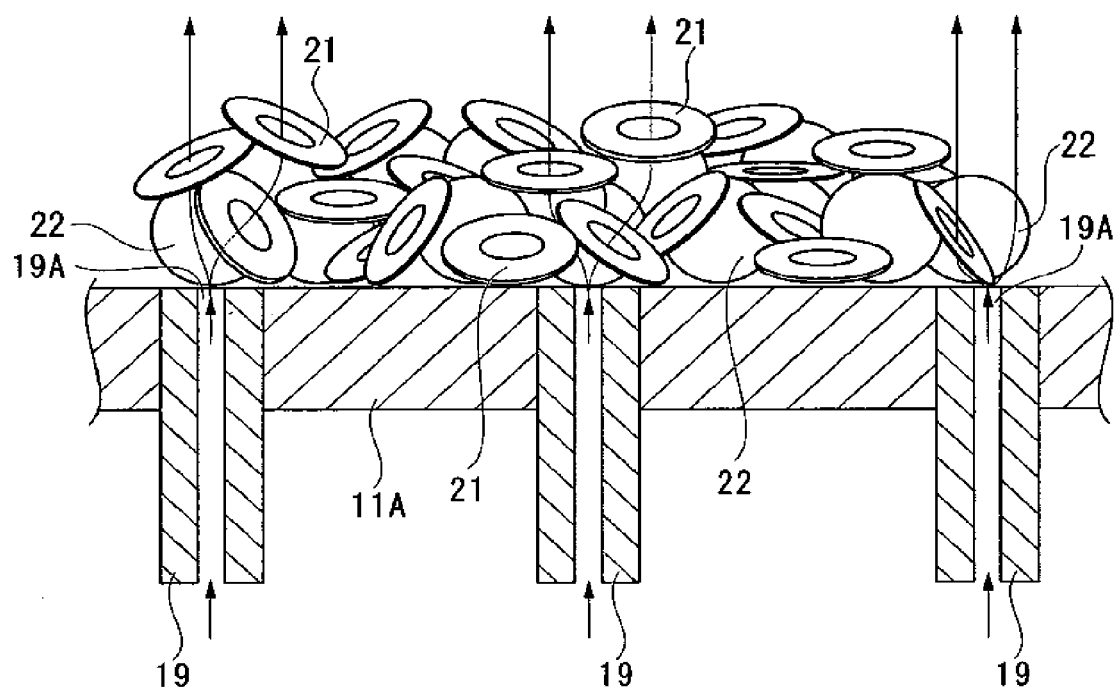
FIG. 4 is a side elevational view for explaining one example showing a state of the ball members and the holed pieces on a mixed layer disposed in the reaction apparatus for producing trichlorosilane shown in FIG. 1.

The thus set ball members 22 and the holed pieces 21 are mixed, by which the mixture layer 20 is in a state in which, for example, as shown in FIG. 4, the ball member 22 is interposed between the holed pieces 21, thereby preventing the holed pieces 21 from being firmly attached to each other. Further, the holed piece 21 is in contact with the outer surface (spherical surface) of the ball member 22.

The ball members 22 and the holed pieces 21 are mixed so as to give a mixture ratio of W1/W2=0.5 to 5 where a weight of the ball member 22 is expressed as W1 and that of the holed piece 21 is expressed as W2.

Next, a description will be given of a method for producing trichlorosilane by the thus constituted reaction apparatus 10 for producing trichlorosilane.

The metal silicon powder M is supplied into the apparatus body 11 through the silicon powder supplying port 12 by gas flow transportation.

Further, the gas introduction device 16 is used to introduce hydrogen chloride gas into the apparatus body 11. The hydrogen chloride gas is ejected into the apparatus body 11 through a plurality of ejection ports 19A of the ejection member 19 disposed at the bottom part of the apparatus body 11.

The hydrogen chloride gas ejected through the ejection ports 19A of the ejection member 19 is introduced into metal silicon powder M through a mixture layer 20 in which the ball members 22 and the holed pieces 21 are mixed. At this time, the hydrogen chloride gas is introduced through a clearance between the holed pieces 21, that between the ball members 22 and that between the holed piece 21 and the ball member 22, by which it is to be dispersed uniformly into the metal silicon powder M.

As described so far, hydrogen chloride gas is introduced into the metal silicon powder M supplied into the apparatus body 11, by which the metal silicon powder M is fluidized uniformly inside the apparatus body 11. In this case, the agitation device 15 is rotated by a motor 15A, facilitating the fluidization of the metal silicon powder M. The metal silicon powder M is in contact with the hydrogen chloride gas, while being fluidized, thereby the metal silicon powder M is reacted with the hydrogen chloride gas, generating trichlorosilane gas.

The thus generated trichlorosilane gas is taken out from the gas outlet 14 disposed at a ceiling part of the apparatus body 11 and supplied to subsequent steps.

Further, after the reaction apparatus 10 for producing trichlorosilane is used for a predetermined time, the ball members 22 and the holed pieces 21 are taken out, and a mixture of them is separated into the ball members 22 and the holed pieces 21 by a separator, which are each washed and used again.

In the reaction apparatus 10 for producing trichlorosilane, which is the thus constituted present embodiment, the mixture layer 20 in which the circular flat-plate shaped holed pieces 21 and the ball members 22 are mixed is disposed on the upper side of the ejection member 19 (ejection port) of the gas introduction device 16 provided at the bottom part of the apparatus body 11. As a result, the ball member 22 is interposed between the holed pieces 21 so that the holed pieces 21 will not be firmly attached so as to be stacked on each other; thereby, a clearance is secured. Further, the holed pieces 21 are arranged so as to be in contact with the outer surface of the ball member 22 and easily movable by ejection of hydrogen chloride gas.

Therefore, hydrogen chloride gas ejected from the ejection port 19A of the ejection member 19 is, as shown by the arrow in FIG. 4, introduced into the metal silicon powder M through a clearance between the holed pieces 21, that between the ball members 22, and that between the holed piece 21 and the ball member 22. At the same time, the holed pieces are moved by ejection of hydrogen chloride gas, by which hydrogen chloride gas can be dispersed widely, the metal silicon powder M can be uniformly in contact with hydrogen chloride gas, the generation of silicon tetrachloride can be reduced to the least possible extent; thereby, producing trichlorosilane more efficiently.

Further, the ball members 22 and the holed pieces 21 are used to suppress the metal silicon powder M from entering into the ejection ports 19A of the ejection member 19, thus making it possible to prevent clogging of the ejection ports 19A.

Since the ball member 22 is set to be from 5 mm to 20 mm in diameter D1 and the holed piece 21 formed in a circular flat-plate shape is set to be from 4 mm to 20 mm in outer diameter D2, it is possible to prevent the ball members 22 or the holed pieces 21 from being blown upward by ejection of hydrogen chloride gas, and the ball members 22 and the holed pieces 21 are arranged in a mixed manner, thus making it possible to maintain the mixture layer 20.

Further, since the inner diameter d of the holed piece 21 is set to be smaller than the diameter D1 of the ball member 22, there is no chance that the ball members 22 enters into the holed pieces 21, thus making it possible to prevent the holed pieces 21 from being firmly attached so as to be stacked on each other.

Still further, since the ball members 22 and the holed pieces 21 are set to be larger than the ejection ports 19A of the ejection member 19, there is no chance that the ejection ports 19A are blocked by the ball members 22 or the holed pieces 21.

The ball members 22 and holed pieces 21 are able to disperse hydrogen chloride gas widely in a state that they are retained to such an extent to move slightly at a lower part of the apparatus body 11, while suppressing a phenomenon in which they are blown upward to the upper part of the apparatus body 11 due to the ejection pressure of hydrogen chloride gas. In the present embodiment, the ball members 22 and the holed pieces 21 are mixed so as to give a mixture ratio of W1/W2=0.5 to 5 where the weight of the ball member 22 is expressed as W1 and that of the holed piece 21 is expressed as W2. This is because when a weight mixture ratio of the ball member 22 to the holed piece 21 is lower than 0.5, it is difficult to suppress a phenomenon that the holed pieces 21 are blown upward by hydrogen chloride gas, and on the contrary, when the weight mixture ratio is in excess of 5, the ball members 22 settle down, thus making it difficult to maintain a mixed state with the holed pieces 21. Therefore, as being expressed by the above weight mixture ratio, the ball members 22 are interposed between the holed pieces 21 to secure a clearance, thus making it possible to reliably attain the effect of dispersion of hydrogen chloride gas.

A description has been so far given of the reaction apparatus for producing trichlorosilane, which is an embodiment of the present invention. However, the present invention shall not be limited thereto and may be modified appropriately within a scope not departing from the technical idea of the invention.

For example, in the present embodiment, a description has been given of a case where the circular flat-plate shaped washer is used as a holed piece. However, the present invention shall not be limited to the above shape of the holed piece and the holed piece may be fowled in a rectangular flat-plate shape. It is noted that, as described in the present embodiment, a conventional washer can be used for producing trichlorosilane according to the present invention, thus reducing the cost to constitute the reaction apparatus.

Further, a description has been given of the ball members and the holed pieces which are made of stainless steel. However, the ball members and the holed pieces are not limited to a particular member but may be made of ceramic or steel for general purposes, for example. A hydrogen chloride-resistant member can be used to extend the service life of the ball members and the holed pieces.

Still further, a description has been given of a case where a ball member is used as the pellet. However, the present invention shall not be limited thereto, and the pellet may be formed in a cubic shape or a rectangular solid shape.

In addition, the diameter of the ball member as the pellet is set to be greater than the inner diameter of a washer as the holed piece, by which no pellet is inserted therethrough into a hole of the holed piece. However, when the pellet is formed in a bar shape and the bar is smaller in diameter than a hole of the holed piece, it can be formed so as to be difficult to insert therethrough into the hole of the holed piece, if the length of the bar is set to be sufficiently greater than the hole. In the present invention, a through hole of the holed piece is specified in such a dimension that no pellet is inserted therethrough. This means that the pellet includes that which is formed in a long thin shape, or such a shape that will not easily pass through a through hole, depending on a direction in which it is placed even if the pellet has a part smaller than the through hole depending on a direction in which it is measured.

Further, a shape of the apparatus body, constitutions of the gas introduction device, gas outlet, metal silicon powder supply port, discharge port and agitation device are not limited to those illustrated but may be modified appropriately. The example shown in FIG. 4 is in a state in which the ejection port 19A of the ejection member 19 is flush with the upper face of the partition plate 11A. However, it is not necessary to be flush with the upper face of the partition plate 11A, and the top portion of the ejection member 19 (the ejection port 19A) may be slightly protrudent from the upper face of the partition plate 11A.

Still further, in the present embodiment, the ball members 22 and the holed pieces 21 are mixed so as to give a mixture ratio of W1/W2=0.5 to 5 where the weight of the ball member 22 is expressed as W1 and that of the holed piece 21 is expressed as W2. Although hydrogen chloride gas is dispersed most efficiently at this mixture ratio, a ratio other than the ratio shall not be excluded.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for producing trichlorosilane by reacting metal silicon powder with hydrogen chloride gas, thereby generating trichlorosilane, the method comprising:
   stacking a plurality of plate-shaped holed pieces having through holes penetrating in the thickness direction and a plurality of ball members interposed between the plate-shaped holed pieces in a mixed state on the upper side of a partition plate partitioning the bottom part of an apparatus body into which the metal silicon powder is supplied; and
   ejecting the hydrogen chloride gas from an ejection port, which is opened on the upper face of the partition plate, while supplying the metal silicon powder into the apparatus body,
   wherein the ball members and the plate-shaped holed pieces are mixed so as to give a mixture ratio of W1/W2=0.5 to 5 where a weight of the ball members is expressed as W1 and a weight of the plate-shaped holed pieces is expressed as W2.

2. The method for producing trichlorosilane according to claim 1, wherein an inner diameter of the plate-shaped holed piece is smaller than a diameter of the ball member.

* * * * *